United States Patent Office 3,425,593
Patented Feb. 4, 1969

3,425,593
PRESSURE VESSEL WITH A RESILIENT SEPARATING MEMBRANE
Manfred Krämer, Winterbach, Siegfried Mayer, Kleinglattbach, Rudolf Reichert, Giengen an der Brenz, Klaus Rose, Mundelsheim, and Wilhelm Zirps, Gerlingen, Germany, assignors to Robert Bosch G.m.b.H., Stuttgart, Germany, a limited-liability company of Germany
Filed Apr. 19, 1966, Ser. No. 543,586
Claims priority, application Germany, May 22, 1965, B 82,062
U.S. Cl. 220—85                               2 Claims
Int. Cl. B65d 25/04; F16l 55/04

ABSTRACT OF THE DISCLOSURE

A resilient membrane, separating the pressure vessel into two chambers, is held against the inner wall of the vessel by a rigid ring initially of smaller outer diameter than the inner diameter of the membrane and inserted between a reinforced edge region of the membrane, the ring being subsequently expanded after emplacement, the membrane having an outer annular welt fitting into a corresponding annular groove formed on the inner surface of the vessel in the holding region of the membrane.

---

The present invention relates to a pressure vessel having a resilient separating membrane contained therein to subdivide the vessel into a pair of chambers, and more particularly to a cylindrical pressure vessel in which the membrane has marginal portions which are thickened or re-inforced and secured against the inner walls of the pressure vessel by means of a holding member such as a holding ring.

It has been proposed to construct a pressure vessel by assembling a pair of semi-spherical, fitting parts. A membrane is provided to separate the vessel into a pair of chambers; the membrane has a terminal edge which engages a projecting bead formed on a holding ring. The holding ring itself fits with a shoulder against the edge of one of the vessel parts in a region where the latter is joined to the other vessel part; a guide rim of the holding ring may be provided, fitting into the other vessel part as well. For such a construction, a plurality of finished, machined and fitting surfaces are necessary, which increases the cost of the pressure vessel. Further, it is possible that the membrane becomes damaged when the vessel is assembled, because it must be pressed for a substantial distance into one of the vessel parts after having been assembled with the holding ring.

A pressure vessel has also been proposed in which a reinforced, thickened edge of the membrane is secured directly against an internal plate inserted into one of the parts of the separable pressure vessel. The inner portion of the re-inforced edge is secured by means of a holding element which extends over the entire inner surface of the cover. The holding element has a turned over edge and further engages the membrane at a step-like projection formed therein to further secure the membrane in position. This construction requires additional material, and manufacture of the holding ring requires special, and expensive tools.

It is an object of the present invention to provide a pressure vessel having a resilient separating membrane therein which may be secured in a simple and effective manner, and which has long operating life.

Briefly, the present invention, relates to a pressure vessel wherein a separating membrane is inserted into a separable part of the, for example cylindrical pressure vessel. The separating membrane has marginal portions which bear against the inner wall of the vessel. A holding member bears against the marginal portions and presses the marginal portions against the walls of the vessel. According to the invention, the holding member is so constructed that it has an outer dimension, when assembled with the membrane, which is larger than the inner dimension of the marginal portions of the membrane before assembly into the pressure vessel. The holding member, engaging only the marginal portions of the membrane, will thus resiliently deform the membrane in the region of engagement therewith and press the thus deformed regions securely against the inner wall of the vessel.

The structure, organization and operation of the invention will now be described more specifically in the following detailed description with reference to the accompanying drawings, in which.

Figure 1:
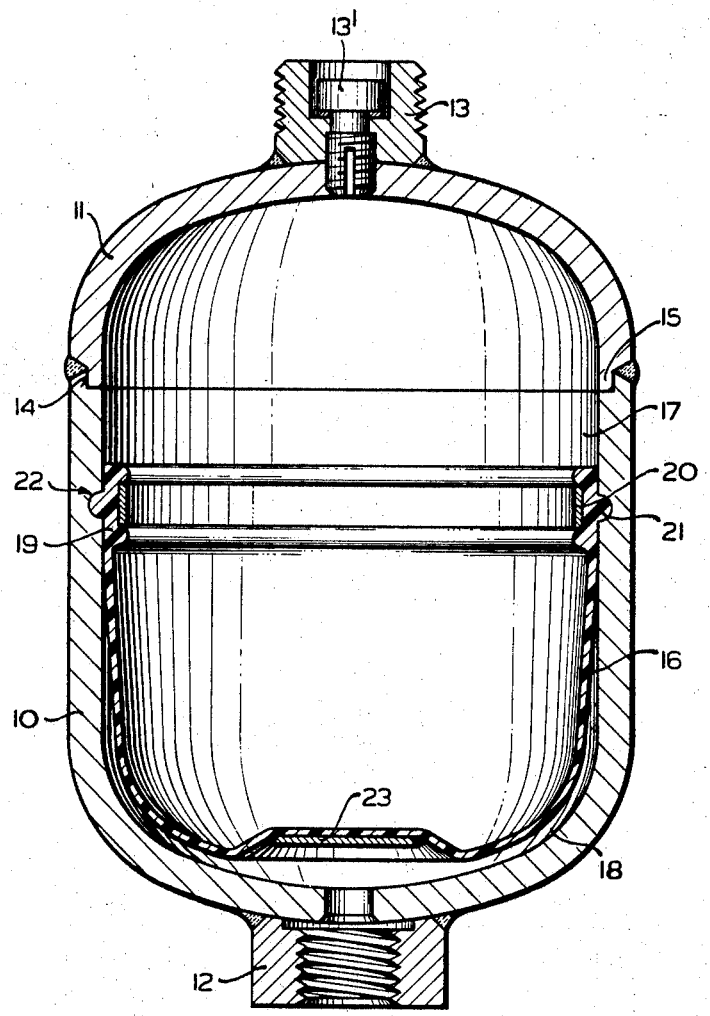
FIG. 1 is a vertical cross-sectional view of a circular pressure vessel.

In the drawings, like reference numerals refer to like parts. The pressure vessel consists of a lower part 10 and an upper part 11, both having domed covers, or ends. A connection stub 12 is joined to the bottom of part 10 to introduce therein, or remove therefrom, a pressure liquid. The upper part 11 has a connection stub 13 secured thereto, to introduce a compressible medium such as a pressure gas. Bores connect the connection stubs to the interior of the pressure vessel. A gas valve 13', shown schematically only, is located within inlet stub 13.

The ends of the vessel parts 10, 11, which are to fit together have matching, fitted interlocking recesses and projections, 14, 15 respectively. The two parts are welded together at their juncture.

The interior of the vessel is separated by means of a flexible membrane or dividing element 16 into a gas chamber 17 and a liquid chamber 18. The rim, or marginal portion, of the separating membrane 16 is re-inforced at its interior side by a re-inforcing, or thickening strip 19. A ring 20 is embedded in this thickened edge 19, to secure the membrane 16 within the vessel. The ring 20 has a rectangular cross-section. Its outer diameter, when assembled into the vessel, is larger than the interior diameter of the re-inforced strip 19 before the ring is inserted therein. After assembly, ring 20 resiliently deforms the re-inforced strip 19 and presses it strongly and securely against the interior wall of the vessel. The material of the strip 19, bulging out on either side of the ring 20, forms projecting welts, which prevent shifting of the position of the ring 20. It is also possible to form the re-inforced marginal portion 19 already with a seating groove for the ring 20; the interior diameter of this groove, before assembly, will as before stated, be smaller than the outer diameter of the ring 20.

The interior wall of the vessel may be formed with a circumferential groove 22, into which a welt 21 formed on the outer surface of the marginal portion 19 may enter. Groove 22 should be somewhat below the junction of the two vessel parts 14, 15. The membrane is thus secured against shifting or change in position within the vessel.

The bottom of the membrane has a closure plate 23 secured thereto, arranged to fit against and close off the bore in the vessel part 10 joining with connection stub 12, to close off the liquid chamber 18 when no liquid is contained therein. The liquid chamber 18 can thus be closed off tightly.

Ring 20 is preferrably made of drawn, shape retaining material. The interior surface of the pressure contanier may remain unfinished, since no fitting parts are matched thereto. Thus, the separating membrane is inexpensively and simply secured while meeting all requirements placed thereon.

Ring 20 may, before assembly, have an outer diameter which is less, or the same as the interior diameter of the re-inforced marginal portions 19 of the membrane, when not assembled. It is closed in itself. After assembling membrane 16 into the part 10 of the pressure vessel, the ring 20 is placed on the marginal portion 19 of the membrane 16 and, by means of a tool, expanded or spread to such an extent that the material of the ring is strained above its elastic limit, so that it will press the marginal portion 19 securely against the inner wall of the pressure vessel.

Figure 2:
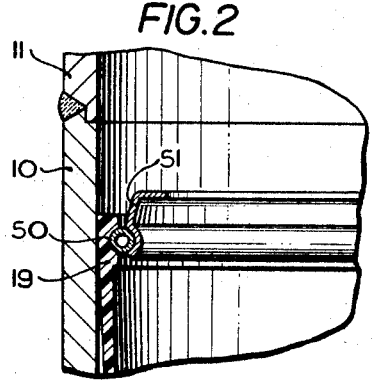
FIG. 2 is a partial vertical sectional view showing a different embodiment of the invention.

FIG. 2 shows a further embodiment of the present invention. The membrane is formed with a re-inforced marginal portion 19, which has a groove formed therein. A circular spring 50 is inserted into the groove. A sheet metal spreader ring 51, provided with a groove to receive spring 50 at the end of a depending conical portion, presses the spring 50 forcefully against the welt. The diameter of the ring, measured at the groove within sheet metal element 51 where it bears against spring 50, is made of such size that it is larger than the inner diameter of the spring element 50, before asembly into the pressure vessel. The groove, in the inner wall of the vessel part 10, is not a required feature to secure the separating membrane within the vessel, and thus not shown.

Pressure vessels having a separating membrane in accordance with the present invention may be used not only with a liquid, and a gas chamber, but may also be used with vessels having chambers separating a pair of liquid chambers or a pair of gas spaces.

What is claimed is:

1. In a pressure vessel having a resilient separating membrane therein to subdivide said vessel into two chambers;

said membrane being formed with marginal portions bearing against the inner wall of said vessel;

said inner wall being formed with a groove in the region of engagement of said marginal portions;

a preformed outer welt formed on said marginal portions, said preformed outer welt engaging in said groove;

a closed ring bearing against said marginal portions and pressing said marginal portions against the wall of said vessel and said welt into said groove;

a pair of spaced inner welts formed on said marginal portions adjacent the edge of said ring, the marginal portion of said membrane between said welts defining a seating groove for said ring;

said ring being expanded to have outer dimensions, when asembled into said membrane within the vessel, which are larger than the inner dimensions of said marginal portions of the membrane before assembly of said membrane into the vessel, said ring engaging only said seating groove in said marginal portions of the membrane to resiliently deform said membrane in the region of engagement therewith and press said deformed regions against the inner wall of said vessel and said preformed welt into said groove.

2. In a pressure vessel having a resilient separating membrane therein to sub-divide said vessel into two chambers, said membrane being formed with marginal portions bearing against the inner wall of said vessel; an elastic ring bearing against said marginal portions to press said marginal portions against the wall of said vessel; a metal spreader engaging and expanding said elastic ring and pressing said elastic ring resiliently against said marginal portions; said metal spreader member having an outer dimension, when assembled against said elastic ring which is larger than the inner dimension of said elastic ring bearing against said membrane before assembly of said membrane into the vessel, said ring engaging only said marginal portions of the membrane to resiliently deform said membrane in the region of engagement therewith and to press said deformed regions against the inner wall of said vessel, the deformation of said marginal portions by said elastic ring forming a pair of welts adjacent said ring.

References Cited

UNITED STATES PATENTS

| 2,380,866 | 7/1945 | Overbeke | 138—30 |
|---|---|---|---|
| 2,397,248 | 3/1946 | De Kiss | 138—30 |
| 3,035,614 | 5/1962 | Kirk | 138—30 |
| 3,165,229 | 1/1965 | Paul | 220—85 |
| 3,224,345 | 12/1965 | Doetsch | 220—85 |
| 3,236,411 | 2/1966 | Lander et al. | 220—85 |

RAPHAEL H. SCHWARTZ, *Primary Examiner.*

U.S. Cl. X.R.

138—30